United States Patent [19]

Kobayashi et al.

[11] Patent Number: 4,800,770
[45] Date of Patent: Jan. 31, 1989

[54] RACK-AND-PINION TYPE STEERING GEAR FOR AUTOMOTIVE VEHICLES

[75] Inventors: Nobuo Kobayashi; Iwao Tanimoto; Atsushi Watanabe; Hiroaki Shinto, all of Toyota, Japan

[73] Assignee: Toyota Jidosha Kabushiki Kaisha, Toyota, Japan

[21] Appl. No.: 580,955

[22] Filed: Feb. 16, 1984

[30] Foreign Application Priority Data

May 24, 1983 [JP] Japan ................................. 58-92005

[51] Int. Cl.<sup>4</sup> ............................................... B62D 3/12
[52] U.S. Cl. ...................................... 74/422; 74/498; 403/361
[58] Field of Search .................. 74/422, 498; 180/148; 403/361

[56] References Cited
U.S. PATENT DOCUMENTS 3,844,181 10/1974 Bayle ..................... 74/422
4,095,482 6/1978 Kirschner ............... 74/422
4,263,816 4/1981 Adams ................... 74/422
4,322,986 4/1982 Adams et al. ........... 74/422
4,400,991 8/1983 Breitweg et al. ......... 74/422
4,428,450 1/1984 Streustrom et al. ....... 74/498

Primary Examiner—Allan D. Herrmann
Attorney, Agent, or Firm—Oblon, Fisher, Spivak, McClelland & Maier

[57] ABSTRACT

A rack-and-pinion type steering gear for automotive vehicles including a columnar rack guide made of resin having a small coefficient of friction. An outer diameter of the rack guide in the direction perpendicular to the direction of movement of a rack bar is greater than an inner diameter of a rack guide hole for insertion of the rack guide in such a manner that the transverse cross-section of the rack guide is elliptical. With this arrangement, vibration of the rack guide in the rack guide hole due to an external force dynamically acting on the rack bar, thereby preventing generation of noise from the rack guide hole.

10 Claims, 2 Drawing Sheets

RACK-AND-PINION TYPE STEERING GEAR FOR AUTOMOTIVE VEHICLES

BACKGROUND OF THE INVENTION

This invention relates to a rack-and-pinion type steering gear for automotive vehicles.

This type of steering gear includes a rack bar reciprocating along its axis in a rack housing in association with rotation of a pinion which is in meshed engagement with the rack bar. The rack bar is received by a rack guide at a position where the pinion is meshed with rack teeth of the rack bar.

A conventional rack guide is made of a sintered metal and the like and is accommodated in a rack guide hole formed in the rack housing. There is normally defined an annular clearance between an inner peripheral surface of the guide hole and an outer peripheral surface of the rack guide, which clearance is necessary upon inserting the rack guide into the guide hole along its axis. As a result, when an external force having different directions and magnitudes is applied to the rack bar during rough raod running of automotive vehicles, the rack guide vibrates in the guide hole mainly owing to the clearance, thereby causing generation of a noise in some cases.

SUMMARY OF THE INVENTION

Accordingly, it is an object of the present invention to provide a rack-and-pinion type steering gear for automotive vehicles which may suppress vibration of a rack guide in a rack guide hole due to an external force dynamically acting on a rack bar, thereby preventing generation of noise from the rack guide hole.

It is another object of the present invention to provide a rack-and-pinion type steering gear for automotive vehicles which requires no specific attention being paid to a metal mold for the rack guide.

It is still another object of the present invention to provide a rack-and-pinion type steering gear for automotive vehicles in which there is no interference in installation of the rack guide into the guide hole and subsequent slide action of the rack guide.

According to the present invention, a rack-and-pinion type steering gear comprises a rack housing, a pinion inserted into the rack housing and adapted to rotate in cooperation with rotation of a steering wheel, a rack bar having rack teeth normally meshed with the pinion and adapted to reciprocatingly move along its axis in the rack housing in association with rotation of the pinion, a rack guide hole formed in the rack housing and on the opposite side to the meshed position of the pinion and the rack teeth, and a columnar rack guide inserted into the rack guide hole and receiving the rack bar to guide the axial reciprocating motion thereof. The rack guide is made of resin having a small coefficient of friction and an outer diameter of the rack guide in the direction perpendicular to the direction of movement of the rack bar is greater than an inner diameter of the guide hole in such a manner that the transverse cross-section of the rack guide is elliptical.

Other objects and advantageous features of the invention will become more clear from the following description of the preferred embodiments taken in conjunction with the accompanying drawings.

DETAILED DESCRIPTION OF THE PREFERRED EMBODIMENT

Figure 1:
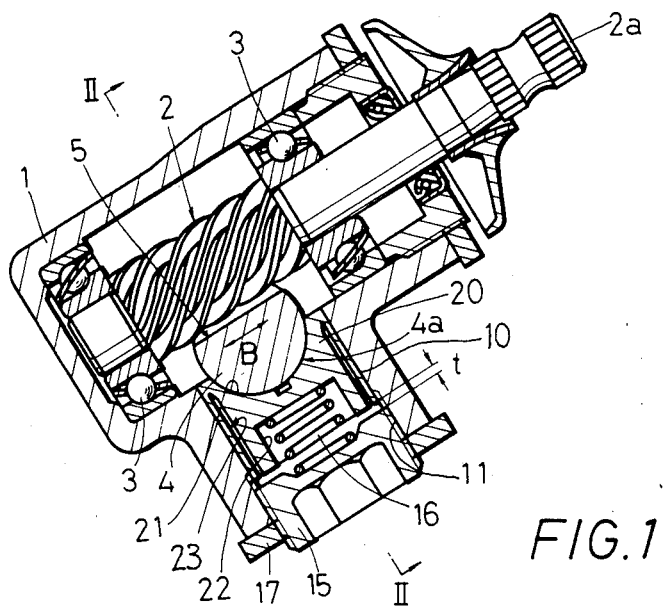
FIG. 1 is a longitudinal sectional view along a pinion shaft showing an essential part of the rack-and-pinion type steering gear of the invention.
Figure 2:
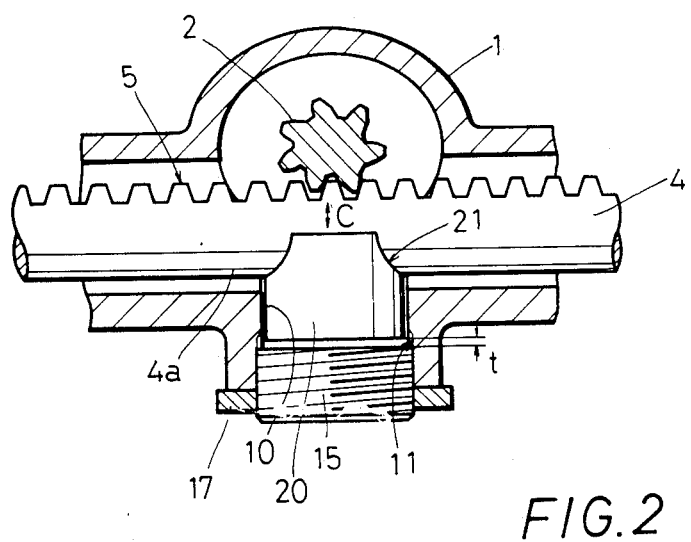
FIG. 2 is a cross sectional view taken along line II—II of FIG. 1.

Referring now to FIGS. 1 and 2, a pinion 2 is rotatably supported by a pair of bearings 3 in a rack housing 1. A shaft portion 2a of the pinion 2 is connected to a steering main shaft (not shown) located at the outside of the rack housing 1. A rack bar 4 is designed to move in its axial direction in the rack housing as best shown in FIG. 2, and is formed with rack teeth 5 meshed with the pinion 2 at a predetermined axial area on its circumferentially upper side.

The rack housing 1 is formed with a circular rack guide hole 10 passing through the wall of the rack housing 1 on the opposite side of the meshed area of the pinion 2 and the rack teeth 5. A columnar rack guide 20 is inserted into the rack guide hole 10 and is formed with a semicircular guide surface 21 receiving a semicircular back surface 4a of the rack bar 4 on its upper end facing to the back surface 4a. The rack guide is further formed with a circular recess 22 for accommodating a spring 16 (which will be hereinafter described) on its lower end.

The rack guide hole 10 is formed with a female thread 11 on its inner wall at the lower opening portion thereof, into which a plug 15 is screwed. The spring 16 is interposed between an inside end of the plug 15 and a top end of the circular recess 22, and the rack guide 20 is biased against the back surface 4a of the rack bar 4 by a resilient force of the spring 16.

Figures 3, 4:
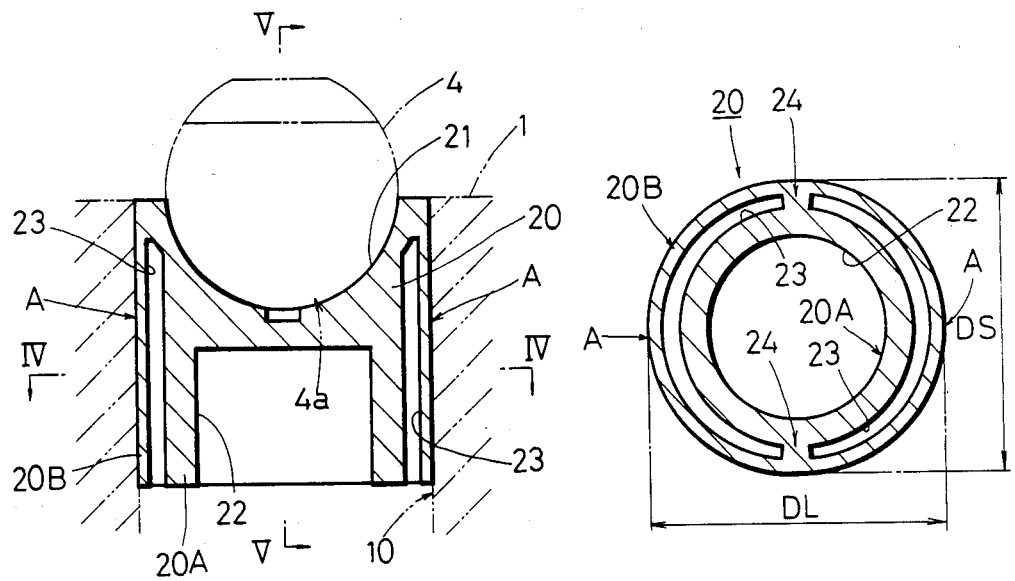
FIG. 3 is an enlarged sectional view of a rack guide.
FIG. 4 is a cross sectional view taken along line IV—IV of FIG. 3.
Figure 5:
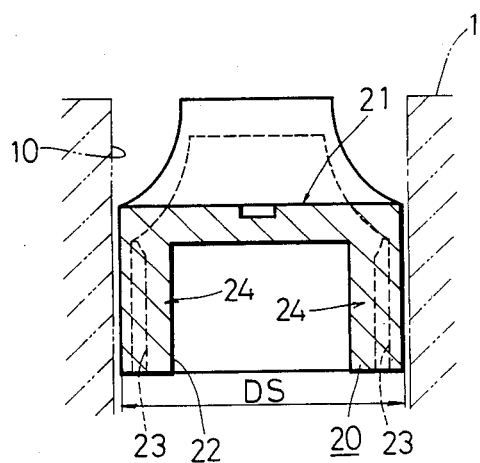
FIG. 5 is a cross sectional view taken along line V—V of FIG. 3.

The columnar rack guide 20 is made of a synthetic resin having a small coefficient of friction such as an oil-containing and oil-free polyamide resin or an oil-containing and oil-free polyacetal resin. As shown in FIGS. 3 to 5, the rack guide 20 includes a pair of diametrically opposed slit 23 extending along the axis of the rack guide in such a manner as to be divided into an inner cylinder 20A and an outer cylinder 20B by the slit 23. The inner and outer cylinders 20A and 20B are connected with each other at the outer circumferential portion on the guide surface 21 side of the rack guide 20. As shown in FIG. 4, there are formed two ribs 24 at the opposite positions of the outer circumferential portion of the rack guide 20. In other words, slit 23 are discontinued at the ribs 24.

As shown in FIG. 4, symbol DL indicates an outer diameter of the rack guide 20 in the direction perpendicular to the direction of movement of the rack bar 4, that is, in the lateral direction as viewed in FIGS. 3 and 4. On the other hand, symbol DS indicates an outer diameter of the rack guide 20 in the same direction as the direction of movement of the rack bar 4, that is, in the vertical direction as viewed in FIG. 4. The outer diameter DL is designed to be greater than an inner diameter of the guide hole 10 and the outer diameter DS is designed to be smaller than the inner diameter of the guide hole 10. In other words, the transverse cross-section of the rack guide 20 is in an elliptical shape with a major axis of the outer diameter DL. Such an elliptical shape of the rack guide 20 is formed by the outer cylinder 20B. Moreover, as the thickness of the outer cylinder 20B is less than that of the inner cylinder 20A, the larger diametrical portion A indicated by the outer diameter DL is easy to be elastically deformable.

Further, as the smaller diametrical portion indicated by the outer diameter DS is connected by the ribs 24. The rack guide 20 is easily formed into an elliptical shape owing to difference in contractivity of a part at the ribs 24 and the other part including the larger diametrical portion A, which difference occurs upon molding of the rack guide 20. Accordingly, it is not required to pay peculiar attention to a metal mold for a rack guide 20.

In operation, the rack bar 4 moves along its axis, that is, in the right and left directions as viewed in FIG. 2, being guided by the rack guide 20 in accordance with rotation of the pinion 2 accompanied by the steering operation. Such a movement of the rack bar 4 is transmitted through a tie rod and a knuckle arm (which are not shown in the drawings.) to wheels. On the contrary, an external force dynamically applied to the wheels during rough road running operation is transmitted through the knuckle arm and the tie rod to the rack bar 4. Such an external force applied to the rack bar 4 is transmitted to the pinion 2. At the same time, a repulsive force against the external force, which is derived from a pressure angle and a lead angle of the rack teeth 5, is applied on the rack bar 4. Therefore, the rack bar 4 receives respective components of motions in the direction along the axis of the pinion 2 (as depicted by an arrow B in FIG. 1) and in the direction such that it leaves the pinion 2 (as depicted by an arrow C in FIG. 2). Such respective components are transmitted to the rack guide 20.

The component of the motion applied on the rack bar 4 in the direction of the arrow B acts as a force to the rack guide 20 in the lateral direction as viewed in FIGS. 3 and 4. In this regard, as the rack guide 20 is inserted into the guide hole 10 with the larger diametrical portion A elastically shrunk, a clearance between the outer periphery of the rack guide 20 and the inner periphery of the rack guide hole 10 is kept null. As a result, the rack guide 20 is prevented from vibrating in the guide hole 10.

The component of the motion applied on the rack bar 4 in the direction of the arrow C in FIG. 2 corresponds to a force in the direction such that it reciprocates the rack guide 20 in the rack guide hole 10. However, a clearance t defined between the rack guide 20 and the plug 15 as shown in FIGS. 1 and 2 is retained by the spring 16 interposed therebetween, and further the clearance t and the resilient force of the spring 16 may be adjusted by controlling the amount of screw-in of the plug 15. Accordingly, the vibration of the rack guide 20 in the direction along the guide hole 10 may be buffered or suppressed.

Further, since the larger diametrical portion A of the rack guide 20 is formed by the outer cylinder 20B with elastisity having a smaller thickness, there is no interference in installation of the rack guide 20 into the guide hole 10 and subsequent slide action of the rack guide 20.

Although a preferred embodiment of the invention has been disclosed and described, it is apparent that other embodiments and modifications of the invention are possible within the scope of the appended claims.

What is claimed is:

1. A rack-and-pinion type steering gear for automotive vehicles comprising:
    a rack housing;
    a pinion inserted into said rack housing and adapted to rotate in cooperation with rotation of a steering wheel;
    a rack bar having rack teeth normally meshed with said pinion and adapted to reciprocatingly move along its axis in said rack housing in association with rotation of said pinion;
    a rack guide hole formed perpendicularly to said rack bar in said rack housing and on the opposite side to the meshed position of said pinion and said rack teeth; and
    a rack guide inserted into said rack guide hole and receiving the back surface of said rack bar to guide the reciprocating motion of said rack bar, said rack guide being made of resin having a small coefficient of friction, an outer diameter of said rack guide in the direction perpendicular to the direction of movement of said rack bar being greater than an inner diameter of said guide hole in such a manner that the transverse crosssection of said rack guide is elliptical.

2. A rack-and-pinion type steering gear for automotive vehicles, comprising:
    a rack housing;
    a pinion inserted into said rack housing and adapted to rotate in cooperation with rotation of a steering wheel;
    a rack bar having rack teeth normally meshed with said pinion and adapted to reciprocatingly move along its axis in said rack housing in association with rotation of said pinion;
    said rack housing including a rack guide hole formed perpendicularly to said rack bar and on the opposite side to the meshed position of said pinion and said rack teeth;
    a rack guide of a columnar shape inserted into said rack guide hole and receiving the back surface of said rack bar to guide the reciprocating motion of said rack bar, said rack guide being made of resin having a small coefficient of friction, an outer diameter of said rack guide in the direction perpendicular to the direction of movement of said rack bar being greater than an inner diameter of said guide hole in such a manner that the transverse cross-section of said rack guide is elliptical; and
    a pair of diametrically disposed slits in said rack guide, said slits being interconnected by two oppositely disposed ribs and extending along an axis of said rack guide in such a manner as to divide said rack guide into an inner cylinder and an outer cylinder.

3. The rack-and-pinion type steering gear as defined in claim 2 wherein said inner and outer cylinders are connected with each other at the outer circumferential portion on the guide surface side of said rack guide.

4. The rack-and-pinion type steering gear as defined in claim 2 wherein the thickness of said outer cylinder is less than that of said inner cylinder and the circumference of said outer cylinder is in the form of an elliptical shape in crosssection.

5. The rack-and-pinion type steering gear as defined in claim 2 wherein said rack guide is made of a synthetic resin having a small coefficient of friction.

6. The rack-and-pinion type steering gear as defined in claim 5 wherein said synthetic resin is an oil-containing polyamide resin.

7. The rack-and-pinion type steering gear as defined in claim 5 wherein said synthetic resin is an oil-free polyamide resin.

8. The rack-and-pinion type steering gear as defined in claim 5 wherein said synthetic resin is an oil-containing polyacetal resin.

9. The rack-and-pinion type steering gear as defined in claim 5 wherein said synthetic resin is an oil-free polyacetal resin.

10. The rack-and-pinion type steering gear as defined in claim 2, further including a plug screwed into said guide hole from the outside of said housing and a spring interposed between the inner end of said plug and the top end of a cylindrical recess formed in said rack guide, whereby a clearance defined between said rack guide and said plug and a resilient force of said spring are adjustable by controlling the amount of screw-in of said plug.

* * * * *